United States Patent [19]

Martell et al.

[11] Patent Number: 5,703,781
[45] Date of Patent: Dec. 30, 1997

[54] AUTOMATIC MARKET MAKING SYSTEM AND METHOD

[75] Inventors: Charles R. Martell, Dallas; Michael J. Cassidy, Richardson; Anita K. Ramsey, Garland; Zih-Fang Liu, Plano; Chou Ling Ting, Garland; H. Anderson McKellar, Dallas, all of Tex.

[73] Assignee: Gerger Garment Technology, Inc., Tolland, Conn.

[21] Appl. No.: 712,993

[22] Filed: Sep. 5, 1996

Related U.S. Application Data

[63] Continuation of Ser. No. 184,974, Jan. 24, 1994, abandoned.

[51] Int. Cl.$^6$ .................................................. G06F 19/00
[52] U.S. Cl. .......................... 364/470.06; 364/470.03; 382/111
[58] Field of Search ...................... 364/470.01, 470.02, 364/470.03, 470.04, 470.05, 470.06, 470.14, 470.13, 474.09, 474.13; 382/14, 284–286

[56] References Cited

U.S. PATENT DOCUMENTS

| | | | |
|---|---|---|---|
| 4,961,149 | 10/1990 | Schneider et al. | 364/470 |
| 4,972,326 | 11/1990 | Jung et al. | 364/470.14 |
| 5,333,111 | 7/1994 | Chaiken et al. | 364/470.06 |
| 5,487,011 | 1/1996 | Chaiken | 364/470.06 |
| 5,508,936 | 4/1996 | King et al. | 364/470.06 |

FOREIGN PATENT DOCUMENTS 0338964  10/1989  European Pat. Off. .

OTHER PUBLICATIONS

Victor Milenkovic, et al., "Automatic Marker Making," *Fourth Canadian Conference on Computational Geometry*, Aug., 1992, pp. 1–10.

*Primary Examiner*—Reba I. Elmore
*Assistant Examiner*—Thomas E. Brown
*Attorney, Agent, or Firm*—Baker & Botts, L.L.P.

[57] ABSTRACT

An automatic marker making system and method are provided in which the creation of a new marker is facilitated through the use of already existing marker designs. A computer database of existing markers is searched for markers that are "similar" to the marker being created. An existing marker is considered "similar" if it meets certain user-specified, marker making criteria. Initially, position and orientation data from pattern pieces in the "similar" marker are used to position and orient corresponding pieces in the new marker. Then, the new marker is "compacted" using a software routine to nest all of the new pieces simultaneously, instead of nesting one or two pieces at a time. The compacting routine corrects overlaps between pieces and assures that the new pieces are nested as efficiently as possible.

16 Claims, 4 Drawing Sheets

AUTOMATIC MARKET MAKING SYSTEM AND METHOD

CROSS-REFERENCE TO RELATED APPLICATIONS

This application is a continuation of application Ser. No. 08/184,974, filed Jan. 24, 1994, entitled "Automatic Market Making System and Method," by Charles R. Martell, Michael J. Cassidy, Anita K. Ramsey, Zih-Fang Liu, Chou Ling Ting, and H. Anderson McKellar, now abandoned.

TECHNICAL FIELD OF THE INVENTION

This invention relates generally to the manufacture of sewn goods, and more particularly, to a method and system for automatically making pattern markers.

BACKGROUND OF THE INVENTION

In the sewn goods industry, marker making (pattern nesting) has long been an essential process in the manufacture of clothing. Originally, markers were created manually by experienced marker makers. In the early 1970's, the process of marker making was partially automated with the advent of interactive systems using computer graphics. Interactive marker making systems are now used extensively throughout the worldwide sewn goods industry. Nevertheless, although interactive marker making may be superior to manual marker making, it is still highly labor intensive, time consuming, prone to errors, and the results can vary according to an operator's skill.

Interactive marker making technology has improved significantly during the past twenty years, primarily as a result of hardware advances which have provided faster responses to operator input, and higher resolution color graphics. However, since the processing speed of the hardware has greatly surpassed the speed at which an operator can perform, any future improvements due to hardware advances will be relatively limited. Consequently, significant improvements in the field of marker making will be achieved primarily through the development of software designed to automate the marker making process.

Many attempts have been made to develop software that would fully automate the marker making process. However, since marker making is not one "problem," but many separate problems with different sets of constraints, a singular solution has been difficult to achieve. For example, in an article entitled: "Automatic Marker Making" by Milenkovic et al., which was published in the *Abstract for Fourth Canadian Conference on Computational Geometry*, St. John's, Newfoundland in August 1992, and incorporated herein by reference, the authors describe the "problem" of automatic marker making as follows:

The marker width represents the width of the bolt of cloth from which the [clothing] will be cut. Due to the vagaries of the textile industry, there is no standard width for a bolt of cloth. The demand for different sizes and styles also varies in an unpredictable fashion. The pieces are polygons, and the goal is to place the pieces in a non-overlapping configuration that minimizes the length of the marker. . . . Pieces can be flipped about the x or y axis and they can be rotated 180 degrees. In some cases, the cloth has a direction or "nap", and only a flip about the x axis is allowed. Finally, small rotations of up to 3 degrees are sometimes permitted.

Additionally, a marker for men's suits will be quite different from markers for bras or tee shirts made with tubular knit materials, sofas with floral designs, shoe insoles cut from laminated synthetic material, billfolds cut from leather or vinyl, or even tents cut from canvas material. Consequently, given the multitude of variables encountered in developing a marker, a highly efficient, automatic marker making system has been difficult to implement up to this time.

SUMMARY OF THE INVENTION

Accordingly, a need exists in the sewn goods manufacturing industry for a highly efficient, automatic marker making system and method. In accordance with the present invention, an automatic marker making system and method are provided in which the creation of a new marker is facilitated through the use of already existing marker designs. A computer database of existing markers is searched for markers that are "similar" to the marker being created. An existing marker is considered "similar" if it meets certain user-specified, marker making criteria. Initially, position and orientation data from pattern pieces in the "similar" marker are used to position and orient corresponding pieces in the new marker. Then, the new marker is "compacted" using a software routine to nest all of the new pieces simultaneously, instead of nesting one or two pieces at a time. The compacting routine corrects overlaps between pieces and assures that the new pieces are nested as efficiently as possible.

An important technical advantage of the present invention is that the marker making process is fully automated, which decreases marker development time and the attendant costs of that development.

Another important technical advantage of the invention is that the resulting markers may be made more efficiently than conventional markers, which reduces fabric waste and attendant costs.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
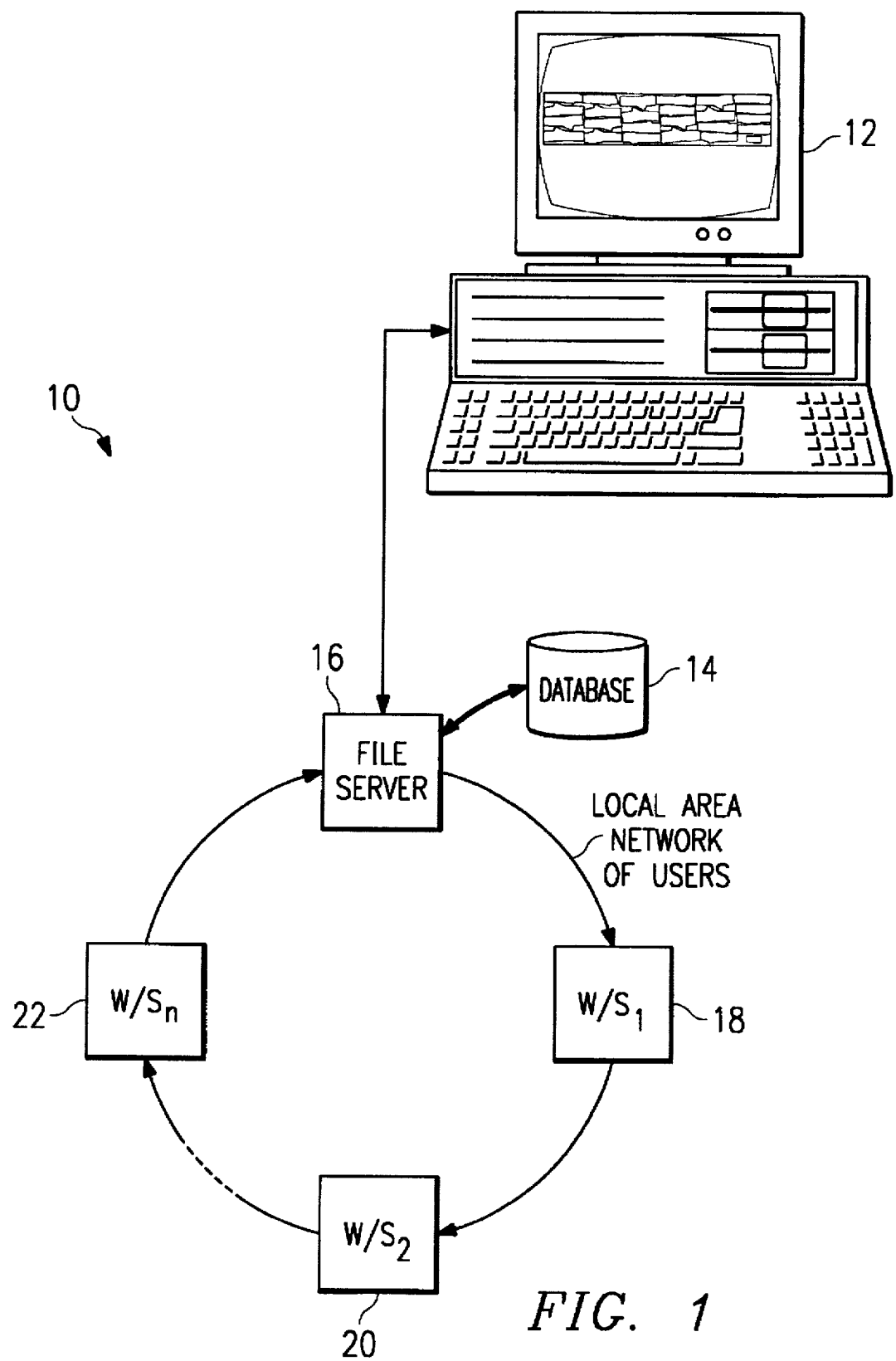
FIG. 1 illustrates a computer-based network that may be used to implement a preferred embodiment of the present invention.

The preferred embodiment of the present invention and its advantages are best understood by referring to FIGS. 1–2 of the drawings, like numerals being used for like and corresponding parts of the various drawings.

FIG. 1 illustrates a computer-based network that may be used to implement a preferred embodiment of the present invention. Automatic marker making system 10 includes processor 12, which typically would possess a RISC architecture. Preferably, processor 12 may be an IBM RS/6000 system running with IBM's powerful AIX operating system. However, the present invention is not intended to be limited to a particular brand of computer system. Any "state of the art" computer system that is capable of performing the functions of processor 12, while maintaining the efficiencies provided by the present automatic marker making software, may be used for processor 12. Typically, processor 12 may include a CPU with associated components, such as RAM and ROM, a hard drive and floppy drive, a keyboard, and an I/O interface. Consequently, the particulars of inputting, outputting, storing and retrieving data with processor 12 should be readily understood by individuals skilled in the art of designing and/or programming computer systems. Processor 12 is connected to, and communicates with, database 14 located on file server 16. Preferably, as described in detail below, the pertinent information contained in the existing marker data files resides in database 14 in the "SQL" database file management format. Alternatively, it is within the scope of the invention to maintain existing marker data in an appropriate, relational database file management format.

At predetermined intervals, file server 16 "searches" all user-specified directories and data files for existing markers stored at workstations $W/S_1-W/S_n$ or file server 16, itself. These workstations may be interconnected with file server 16 via a conventional local area network. For example, connections between the workstations and file server 16 may be made using "Token Ring" or "Ethernet" hardware connections. Preferably, each of workstations $W/S_1-W/S_n$ includes an Intel 486 microprocessor or equivalent processor that is designed for relatively high processing speed. By checking dates and times of the data files, file server 16 periodically determines whether or not the marker data in any of the searched files has been modified or updated since the previous search. If so, then the modified file is retrieved by file server 16 and database 14 is updated. File server 16 either adds the new marker data to database 14 or purges the previously existing marker data from the database.

Figure 2A:
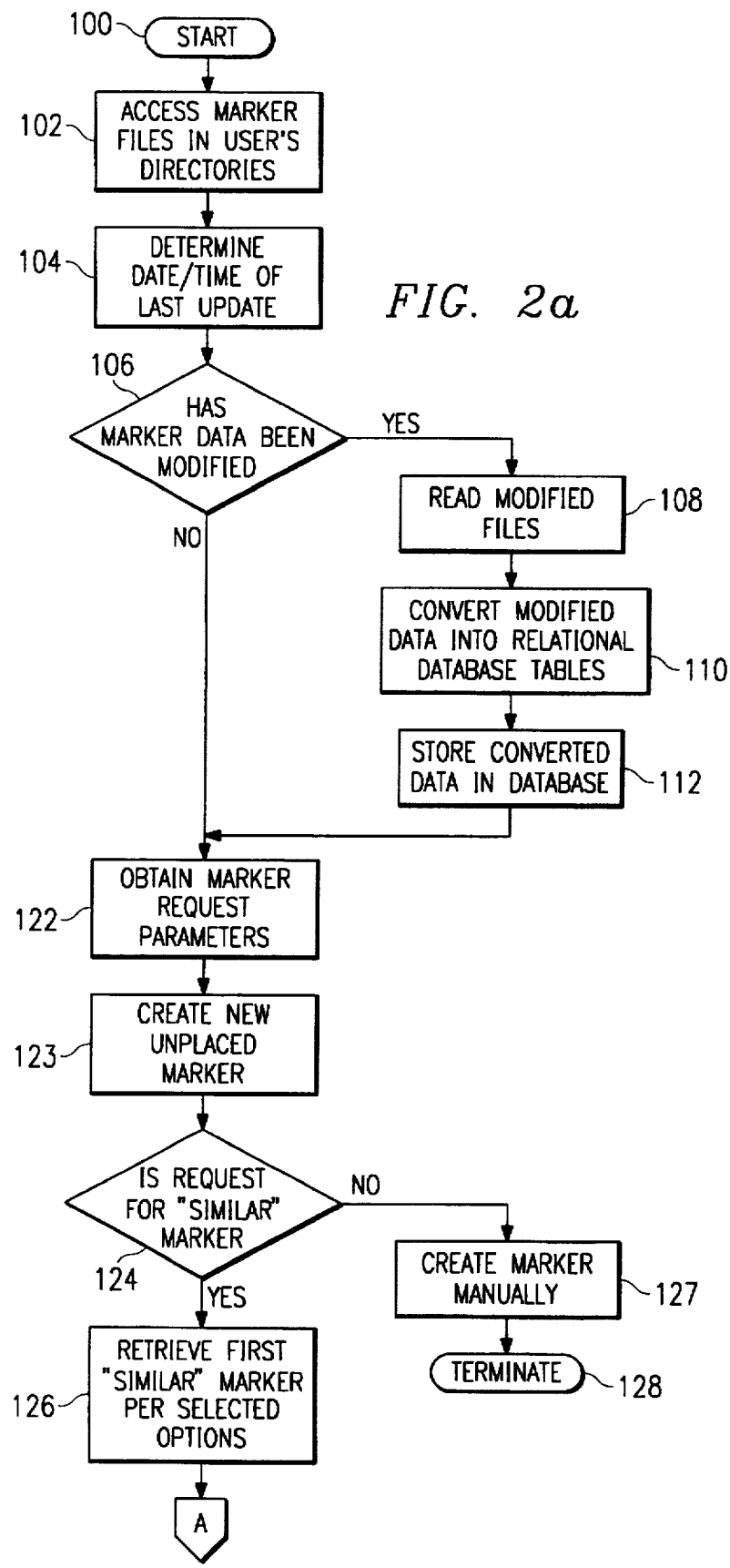
FIGS. 2(a)–(c) illustrate an overall sequence of steps which may be performed to implement a preferred embodiment of the present invention using the network of FIG. 1.
Figure 2B:
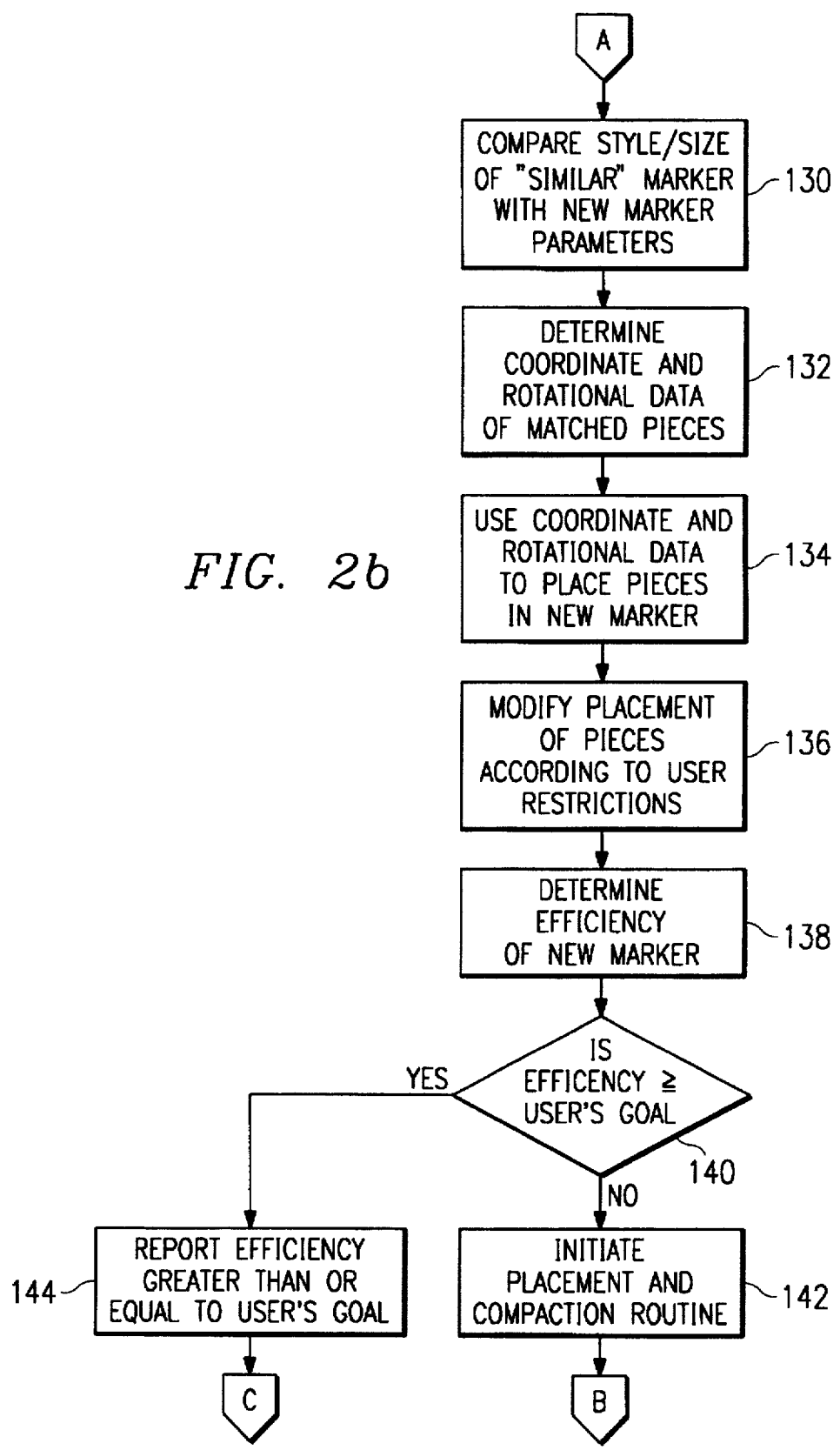
Figure 2C:
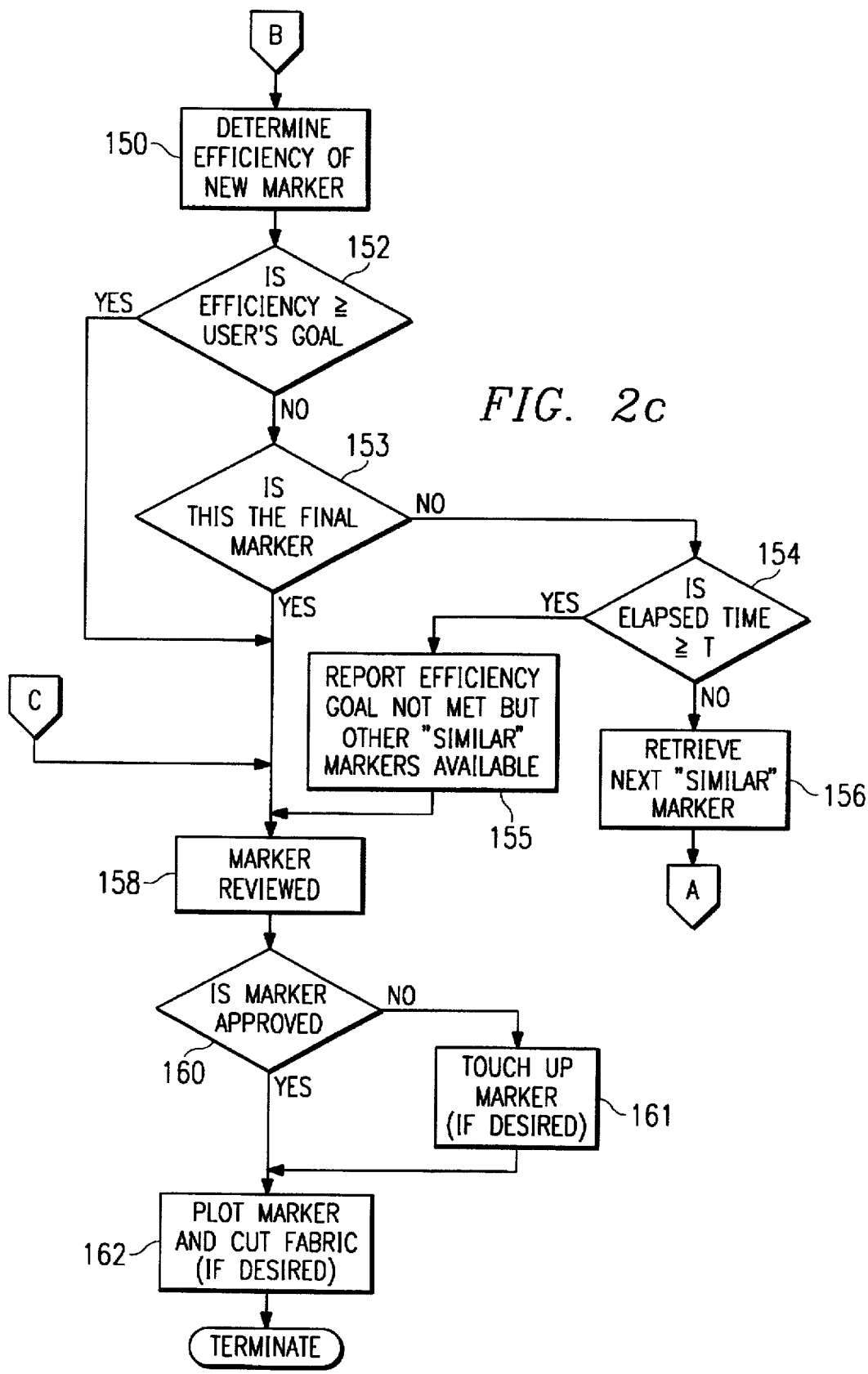

FIGS. 2(a)-(c) illustrate an overall sequence of steps which may be performed to implement a preferred embodiment of the present invention using software residing and operating in processor 12 and file server 16 of FIG. 1. The details of the specific software instructions represented, in pertinent part, by FIGS. 2(a)-(c), are provided in the attached source code listing of the "Similar Marker Search" program, which should be readily understood by one of ordinary skill in the art of computer programming. As described above with respect to the automatic marker making system of FIG. 1, file server 16 may access the existing user databases for updated marker files at workstations $W/S_1-W/S_n$ via the local area network hardware connections. Alternatively, it is within the scope of the invention for file server 16 to retrieve the updated marker data from a diskette, or a centralized database that has been periodically updated. Referring now to FIG. 2(a), the automatic marker making software program cycle is initiated at step 100. At step 102, the specified marker files stored at workstations $W/S_1-W/S_n$ are accessed by file server 16. At step 104, the date and time of the last update is determined for each file. Then, at step 106, if the style and marker data in any file have been updated since the previous access, the sequence proceeds to step 108. However, if there have been no style and marker updates since the previous access, the sequence proceeds from step 106 directly to step 122, and the automatic marker making system of FIG. 1 is ready to begin creating a new marker.

A "style" may be defined as a collection of all the pattern pieces required to create a single garment. Such a collection includes all of the pieces needed to complete the garment with all of its various fabrics. For example, a particular "style" for a jacket may include pieces not only for the external components of the jacket, but also for the jacket's lining, inner-lining, fusing, etc. A "marker" may be defined as an arrangement of pattern pieces placed to achieve the best area utilization within a given width, but limited by restrictions dictated by the fabric.

Proceeding to step 108, as described above, all updated or modified files are read in by processor 12 and converted into an appropriate database file management format (e.g., SQL) at step 110. At step 112, the previously existing marker data, if any, is purged from the respective files in database 14 and replaced with the converted data. The sequence then proceeds to step 122.

The procedure used to create a new marker begins at step 122. If a user inputs a request for a new marker, then at step 122, any marker request parameters specified by the user are read into memory by the workstation making the request. At this point, the user has the option of specifying that certain standard marker making parameters such as, for example, style name(s), material groups (i.e., all pieces to be cut from the same fabric), sizes, quantities, nap/flip restrictions, stripe/plaid repeat values, marker width, etc., will be considered during the generation of a new marker. A new, unplaced marker is generated at step 123. At step 124, an inquiry is then made to determine whether or not the user has requested the creation of a "similar" marker. In other words, the user may have the option of determining whether or not the system will create a new marker using, as a baseline, existing marker files (defined as "similar markers") having pattern characteristics that are substantially similar to the pattern characteristics desired of the new marker. Importantly, the invention provides a significant reduction in processing time through the use of a "similar" marker as the baseline for creation of a new marker, as compared to the process of creating a new marker from scratch. If, at step 124, a request has been made for a new marker to be created from a "similar marker", then the sequence proceeds to step 126. If such a request has not been made, then the sequence terminates, and the marker is made manually by an operator.

Generally, referring again to step 122, in developing a new marker from a baseline or "similar" marker, the user determines the new marker's desired characteristics by specifying certain, standard marker making parameters. These parameters are then used to define the search of database 14 for a "similar" marker. For example, the user may have the option of limiting the search for "similar" markers to those existing markers having a name that is identical or at least substantially similar to the name of a particular pattern. Such a search may be further limited by requiring that only markers containing a particular style or group of styles be considered. Another option may be to limit the search to a marker having a specified width. Such a search may specify any width that falls within a predetermined range of widths. In this case, the user may specify both the minimum and maximum widths to be used for the search. As yet another option, a user may specify that the search should be limited to "similar" markers that have an efficiency (i.e., percentage of area utilized or percentage of waste) that falls within a predetermined minimum/maximum range of efficiencies. Another option allows the user to choose a "similar" marker based on the sizes and quantities of the pieces to be contained in the new marker. A final option allows the user to specify that a "similar" marker must contain a specified number of bundles (i.e., garment sizes or size names). In any event, the above-listed options are exemplary and are not intended to limit the invention. Other options that specify marker making parameters to be used to define a search for a "similar" marker also may be provided.

At step 126, in accordance with the user's selection of options as described above, a first "similar" marker is retrieved from database 14. Essentially, in accordance with the present invention, the "similar" markers found in database 14 are ranked according to their "similarity" to the parameters specified for the new marker. For example, considering the options selected by the user, a "similar" marker found in database 14 that includes all of the specified parameters would be ranked first, followed by the marker having the next highest number of parameters, and so on. Referring now to FIG. 2(b), at step 130, the style/size parameters of the first "similar" marker retrieved from database 14 are compared with the parameters specified for the new marker. Using a commercially available style/size substitution software program developed by Microdynamics, Inc., a style and size substitution is performed with respect to the "similar" marker to create a new marker containing the desired styles and pieces. The style/size substitution program allows the automatic marker making system to use the placement of pieces in the "similar" marker as a reference for placing pieces in the new marker. For example, a marker for one shirt would be similar to a marker for another shirt provided that the sleeve length, collar type, pockets, etc. of the two shirts are similar.

The style/size substitution program allows a user to specify the parameters for creation of a new marker, and also the style/size replacement pairings to be used in making the new marker. Specifically, the placement of pieces in the "similar" marker is used to direct the initial placement of pieces on the new marker. At this point in the sequence, the user may be allowed the flexibility of changing the size of the new marker's width if, for example, the fabric width has been changed. The style/size substitution is completed automatically by the style/size substitution program in the following manner. Initially, a new marker is created with its pieces unplaced, as described above with respect to step 123. These pieces are then placed or positioned in the new marker in accordance with the position and rotational information of their corresponding reference pieces, as described in detail below.

Specifically, style/size replacement pairings, which are used by the substitution program to match the new pieces to the reference pieces, are first determined from pairing the pieces of the new styles with the pieces of the reference styles, and then the sizes of the new pieces are paired with those of the reference pieces. For example, a piece from the "similar" marker is paired with a corresponding new piece by matching a specific size of the piece from one style to another style. The same size may be used for the pieces in both styles, or different sizes may be specified for the pieces. At this point in the style/size substitution sequence, the actual name of the piece within the style may be analyzed to determine a final match. In other words, styles for similar garments contain pieces having similar or identical names. This similarity may be used to help match the pieces from style to style. In one instance, a user may require that a unique name be given to each piece for numerous, different styles. On the other hand, a user may require that the names of pieces for a particular style all start with the same characters, in order to assist in identifying those pieces that belong to the same style as the pieces are being plotted and/or cut. In that case, the user may designate a sequence of characters or numbers to identify the piece type. This identifier may be buried within the name of the piece and would identify the piece to be, for example, a front, back, collar, etc. This information may then be used to match the pieces from one marker to another.

Prior to performing the style/size substitution routine, the user would be allowed to assist in determining the coding scheme by which pieces from the "similar" or reference marker and new marker can be identified and matched. Essentially, the user is given two options that specify how the piece names will be used to match pieces from one style to another. The first option allows the user to designate the particular character in the piece name where a comparison or matching sequence would begin. The second option allows the user to specify the number of characters to be compared; starting at the character specified by the first option. This subset or part of the piece name which is used for comparison purposes may be defined as the "piece type." If the coding for the "piece type" is not specified by the user, then the entire name of a piece will be used in the comparison of reference and new pieces to determine a match.

The following example illustrates how a pairing of pieces may be accomplished with the aforementioned style/size substitution program. For example, a user may specify that the reference or "similar" marker (Marker1) contain a shirt style that the user calls "Shirt91." The user also may specify that the first three letters of a piece name be used to identify a particular style. Consequently, Shirt91 would be defined as containing the pieces S91Front, S91Back, S91collar, S91RSleeve and S91LSleeve. Marker1 contains pieces for Shirt91 sizes S, M and L. Assume that a new shirt style is to be created that the user calls Shirt93. Shirt93 would contain pieces S93Front, S93Back, S93Collar, S93RSleeve and S93LSleeve. The user desires to create a new marker (Marker2) containing pieces for Shirt93 sizes 12, 14 and 16. Next, assume that the user selects coding options that require the piece type to begin at character 4 in the piece name and continue for seven (7) characters. Also, assume that the user has specified with the substitution request that identical marker parameters and restrictions apply for Marker2 that were specified for Marker1. Finally, assume that the user has specified that Shirt93 will be substituted for Shirt91, and that sizes will be substituted as follows: S=12, M=14, and L=16. Accordingly, the following substitutions and replacement pairings will occur:

| MARKER1 | | MARKER2 |
| --- | --- | --- |
| S91FRONT (S) | <=======> | S9 3 FRONT (12) |
| S91FRONT (M) | <=======> | S93FRONT (14) |
| S91FRONT (L) | <=======> | S93 FRONT (16) |
| S91BACK (S) | <=======> | S93BACK (12) |
| S91BACK (M) | <=======> | S93BACK (14) |
| S91BACK (L) | <=======> | S93BACK (16) |
| S91COLLAR (S) | <=======> | S93COLLAR (12) |
| S91COLLAR (M) | <=======> | S93COLLAR (14) |
| S91COLLAR (L) | <=======> | S93COLLAR (16) |
| S91RSLEEV (S) | <=======> | S93RSLEEV (12) |
| S91RSLEEV (M) | <=======> | S93RSLEEV (14) |
| S91RSLEEV (L) | <=======> | S93RSLEEV (16) |
| S91LSLEEV (S) | <=======> | S93LSLEEV (12) |
| S91LSLEEV (M) | <=======> | S93LSLEEV (14) |
| S91LSLEEV (L) | <=======> | S93LSLEEV (16) |

Proceeding to step 132, once the replacement pairings for the reference and new pieces have been determined, as illustrated by the example above, the coordinates and rotational information of the pieces from the reference or "similar" marker (e.g., Marker1) are determined and used at step 134 to place the paired pieces in the new marker (e.g., Marker2). At step 136, the placed pieces are then repositioned and/or reoriented, if necessary, according to any placement restrictions that were specified by the user. After the performance of step 136, the placement coordinates and rotational positions of the pieces in the new marker (e.g., Marker2) will be the same as the corresponding pieces in the reference marker (e.g., Marker1). However, the resulting marker may contain overlapped pieces which must be corrected, or contain excessive gaps between pieces that may still need to be compacted, depending on the efficiency goals specified by the user. At this point in the sequence, the efficiency of the new marker may be more or less than that of the "similar" marker.

Consequently, at step 138, the efficiency of the resulting marker is determined. Then, at step 140, an inquiry is made to determine whether or not the efficiency determined in step 138 is greater than or equal to the efficiency goal specified by the user. If so, then the sequence proceeds to step 158 (FIG. 2(c)). Conversely, if the efficiency determined in step 138 is less than the user's specified efficiency, then the sequence proceeds to step 142, whereby the efficiency of the new marker may be improved.

Step 142 initiates the software routines that are used to eliminate overlaps and compact the resulting marker. The data in the new marker files, which are provided by the Similar Marker Search program developed by the Applicants, are then processed by overlap correction and compaction programs which were developed as a cooperative venture between the Applicants and a team of researchers at Harvard University. The aforementioned article entitled: "Automatic Marker Making" by Milenkovic et al., describes the overlap correction and compaction programs used herein. Using these programs, the present invention produces noticeably "shorter" markers without violating the user's restrictions.

The overlap correction program uses a "Minkowski Sum" algorithm to adjust the position of pieces in the new marker such that no pieces overlap other pieces. Then, the compaction program, which also uses a "Minkowski Sum" algorithm, is used to compact the nest of pieces in the new marker.

The process of "compaction" is a local optimization technique that acts on the pieces in the marker as if they are frictionless solids. The compaction process may provide a constant leftward "gravity" field to compact the nest of pieces and "shorten" the overall marker, or it may "reach in" to open up a gap between pieces by pressing outward on the pieces surrounding the gap.

The compaction program uses the "Minkowski Sum" algorithm to reduce the length shortening process to a series of linear programming tasks. The result of the "compaction" process is normally a shorter marker than the original. The compaction program partitions the marker into several regions. A particular region of the marker is then selected for "compaction". That region of pieces is then compacted as tightly as possibly. A higher priority is given to "compactions" that contain hard-to-place pieces. As each region is compacted in turn, there remain fewer pieces from which to select. The compaction program continues until the marker cannot be further shortened.

Referring now to FIG. 2(c), after "compaction" the sequence proceeds to step 150, where the efficiency of the resulting, compacted marker is calculated. An inquiry is then made at step 152 about whether or not the compacted marker's efficiency is greater than or equal to the user's specified goal. If so, then the sequence proceeds to step 158, where an experienced marker maker reviews the marker. At step 160, if the marker is approved by the marker maker, then the marker is plotted at step 162 and the fabric is cut. If the marker is not approved, then it can be modified interactively by the maker at step 161 and plotted at step 162. The fabric may then be cut using the plotted marker and the sequence terminated.

However, if at step 152, the compacted marker's efficiency is less than that specified by the user, then the sequence proceeds to step 153, where an inquiry is made to determine whether or not this marker is the final marker found above in the "similar" marker search. If so, then the sequence proceeds to step 158 so the marker may be reviewed by the experienced maker. If not, then the sequence proceeds to step 154, where an inquiry is made to determine whether or not a predetermined processing time limit (set by the user) has been exceeded in creating this new marker. If the time limit has been exceeded, the sequence proceeds to step 155 where a report is displayed that informs the user that the time limit has expired, but there are "similar" markers that remain to be processed. The sequence then proceeds to step 158.

If, on the other hand, the time limit has not been exceeded, the sequence proceeds to step 156 where the next "similar" marker is retrieved from database 14 for processing. The sequence then returns to step 130 (FIG. 2(b)), where the development cycle is repeated for this "similar" marker. Consequently, since a check is made during each marker making cycle to determine whether or not there are any additional "similar" markers to be processed, the automatic marker making system of the present invention is capable of recycling until either an acceptable, efficient marker is created or the allotted processing time is exceeded.

Although the present invention and its advantages have been described in detail, it should be understood that various changes, substitutions and alterations can be made herein without departing from the spirit and scope of the invention as defined by the appended claims.

---

SIMILAR MARKER SEARCH

```
case IDMSB_SEARCH_PB:
{
    // make query manager as the active window if it is on the
    // working list
    PSWENTRY pSWENTRY;
    ULONG ulTotalEntries;
    ULONG ulIndex;
    BOOL bDone;
    CHAR szCommandComPath[80];
    CHAR szSystemCallBuf[80];
    SwitchList FindQueryManager;

pSWENTRY = FindQueryManager.GetSwitchList
       (CurrentThread->Hab( ));
    ulTotalEntries = FindQueryManager.GetRealTotalEntries( );
    ulIndex = 0;
    bDone = FALSE;

if (ulTotalEntries > 0)
    {
        while(1)
        {
            if (strstr(pSWENTRY->swctl.szSwtitle, QUERYMANAGER) !=
               NULL)
            {
                FindQueryManager.SwitchToProgram(pSWENTRY->hswitch);
                bDone = TRUE;
                break;
            }
            ulIndex++;
            if (ulIndex == ulTotalEntries)
            {
                break;
            }
            pSWENTRY++;
        }
    }
    // find the query manager and bring it up
```

-continued

SIMILAR MARKER SEARCH

```
if (!bDone)
{
    if (DosSearchPath(SEARCH_ENVIRONMENT, (PSZ)"PATH",
            (PSZ)QUERYMANAGEREXE,
            (PBYTE)&szCommandComPath,
            (USHORT)_MAX_PATH) != 0) break;

sprintf(szSystemCallBuf, "%s%s", DATABASEPARAMETER,
            DATABASE);

Session StartQM(INDEPENDENT_SESSION,
            FOREGROUND_SESSION,
            NO_TRACE_SUPPORT,
            (PSZ)NULL,
            (PSZ)szCommandComPath,
            (PBYTE)szSystemCallBuf,
            (PBYTE)NULL,
            INHERIT_FR_SHELL,
            DEFAULT_INIT_SESSION,
            VISIBLE_SESSION);

StartQM.Start(FALSE);
}
lRetVal=FALSE;
break;
}
```

What is claimed is:

1. A system for automatically making markers, comprising:
    a network of interconnected digital processors, each of said digital processors operable to store marker information in memory;
    at least one of said digital processors operable to retrieve and process said marker information stored by each of the other said digital processors;
    said at least one of said digital processors further operable to:
        rank similar markers retrieved from said retrieved marker information according to predetermined marker making criteria;
        select one of the ranked similar markers;
        position and orient pieces in a new marker in accordance with the position and orientation of corresponding pieces in the selected similar marker;
        correct the new marker to eliminate overlaps between the new pieces; and
        compact the new marker using a Minkowski Sum algorithm to shorten the length.

2. The system of claim 1, wherein said network of interconnected digital processors comprises a local area network.

3. The system of claim 1, wherein said network of interconnected digital processors comprises a "Token Ring" network.

4. The system of claim 1, wherein said network of interconnected digital processors comprises an "Ethernet" network.

5. The system of claim 1, wherein said at least one of said digital processors comprises a file server.

6. The system of claim 1, wherein said at least one of said digital processors is further operable to compact the new marker using linear programming to shorten the length.

7. The system of claim 1, wherein the memory of said each of the other said digital processors includes at least a diskette.

8. A method of automatically making markers using a database of existing markers, comprising the steps of:
    retrieving marker information from said database of existing markers;
    ranking similar markers retrieved from said retrieved marker information according to predetermined marker making criteria;
    selecting one of the ranked similar markers;
    positioning and orienting pieces in a new marker in accordance with the position and orientation of corresponding pieces in the selected similar marker;
    correcting the new marker to eliminate overlaps between the new pieces; and
    compacting the new marker using a Minkowski Sum algorithm to shorten the length.

9. The method of claim 8, wherein said step of positioning and orienting further comprises the steps of pairing pieces in the new marker with corresponding pieces in the selected similar marker.

10. The method of claim 9, wherein said step of pairing pieces further comprises the steps of substituting the styles and sizes of pieces in the selected similar marker for the styles and sizes of the corresponding pieces in the new marker.

11. A system for automatically making markers, comprising:
    a digital processor including memory, said digital processor operable to:
        store marker information in said memory;
        retrieve said marker information;
        rank similar markers retrieved from said retrieved marker information according to predetermined marker making criteria;
        select one of the ranked similar markers;
        position and orient pieces in a new marker in accordance with the position and orientation of corresponding pieces in the selected similar marker;
        correct the new marker to eliminate overlaps between the new pieces; and
        compact the new marker using a Minkowski Sum algorithm to shorten the length.

12. The system of claim 11, wherein said digital processor comprises a file server.

13. The system of claim 11, wherein said memory includes a storage area defined as a database.

14. The system of claim 13, wherein said marker information stored in said database is in an SQL format.

15. The system of claim 11, wherein said digital processor is further operable to compact the new marker using linear programming to shorten the length.

16. A method of automatically making markers using a database of existing markers, comprising the steps of:
    retrieving marker information from said database of existing markers;
    ranking similar markers retrieved from said retrieved marker information according to predetermined marker making criteria;
    selecting one of the ranked similar markers;
    positioning and orienting pieces in a new marker in accordance with the position and orientation of corresponding pieces in the selected similar marker;
    correcting the new marker to eliminate overlaps between the pieces; and
    compacting the new marker using linear programming to minimize the marker's length.

* * * * *